A. J. MICHELIN.
PNEUMATIC TIRE.
APPLICATION FILED OCT. 13, 1921.

1,432,483. Patented Oct. 17, 1922.

Inventor
André J. Michelin
by Wilkinson & Fiuta
Attorneys

Patented Oct. 17, 1922.

1,432,483

UNITED STATES PATENT OFFICE.

ANDRÉ JULES MICHELIN, OF PARIS, FRANCE.

PNEUMATIC TIRE.

Application filed October 13, 1921. Serial No. 507,445.

*To all whom it may concern:*

Be it known that I, ANDRÉ JULES MICHELIN, a citizen of the French Republic, residing at Paris, France, have invented certain new and useful Improvements in Pneumatic Tires; and I do hereby declare the following to be a full, clear, and exact description of the invention, such as will enable others skilled in the art to which it appertains to make and use the same.

My present invention relates to improvements in pneumatic tires, and it is intended more especially to provide means for protecting the inner tube of a pneumatic tire against injury, or against being pinched between the inner periphery of the tire casing and the metal rim surrounding the wheel, or from being worn out at the angle where the casing and the rim meet.

It has been found in practice that the inner tube, especially when filled with air at the proper presure to render the tire efficient, tends to be squeezed into the crack or gap formed at the edge of the inner periphery of the tire casing, and between said edge and the outer cylindrical face of the metal rim which is mounted on the felly of the wheel.

Efforts have been made to prevent such injury by inserting strips extending completely across the gap between the two sides of the casing, which strips are interposed between the inner face of the inner tube when distended and the rim of the wheel. Various other methods have been attempted to prevent similar injuries, but as far as I am aware these have been more or less inefficient and unsatisfactory.

According to my invention I provide two separate lining strips of soft rubber, or similar material, which are attached to the inner walls of the tire casing adjacent to the inner periphery thereof, which strips are compressed inwards by the pneumatic pressure applied to the inner tube, causing said strips to form a soft yielding cushion for the inner portion of the inner tube, and permitting said inner tube to remain in contact with the outer face of the rim, thereby allowing part of the heat generated in the inner tube to be transmitted to the rim, incidentally cooling the interior of the tire.

My invention will be more fully understood after reference to the accompanying drawings, in which like parts are indicated by similar reference symbols throughout the several views, and in which:—

Figure 1:
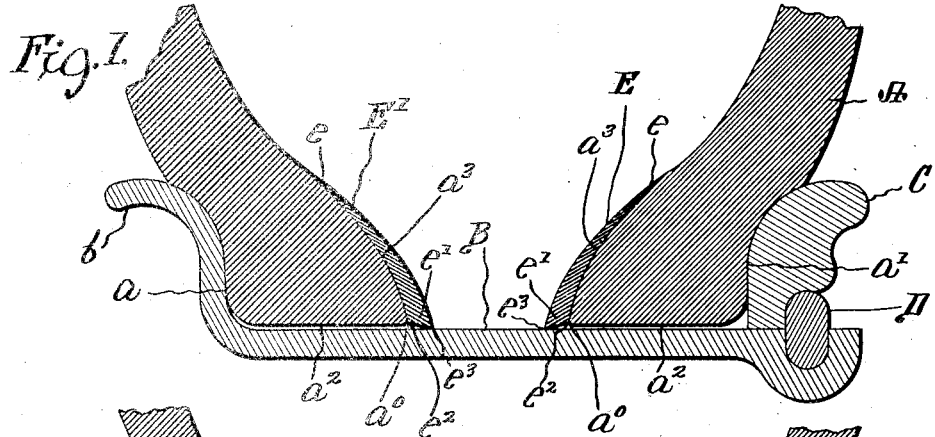
Figure 1 shows a transverse section through the rim and adjacent portions of the tire casing, the inner tube being omitted, and the tire being of the straight side type.

Referring first to Figure 1, A represents the tire casing, having the usual sides $a$ and $a'$ engaging, respectively, the flange $b$ of the rim B and the ring C held in place by the locking ring D.

The inner periphery $a^2$ of the tire casing has a slight clearance from the outer periphery of the rim, as shown, leaving normally a crack on each side between the tube as at $a^0$. At the curved portion $a^3$ at each side of the inner wall of the casing I attach a tapered strip made of soft rubber, or similar material; these two strips being rights and lefts as shown at E and E' in Figure 1. The upper portion $e$ of each strip is comparatively thin as there is very little distortion of this portion, the lower portion of each strip is broadened as at $e'$ and the lower outer edge $e^2$ of each strip coincides with the inner wall $a^2$ of the tire casing, and the free edge $e^3$ of each strip forming a lip normally projecting inwards somewhat further than the edge $e^2$ so as to furnish a suitable flap to be pressed under the inner tube and into the crack $a^0$ when the inner tube is under pressure.

The construction and operation of the two strips E and E' are the same, except these strips are reversely disposed.

Figure 2:
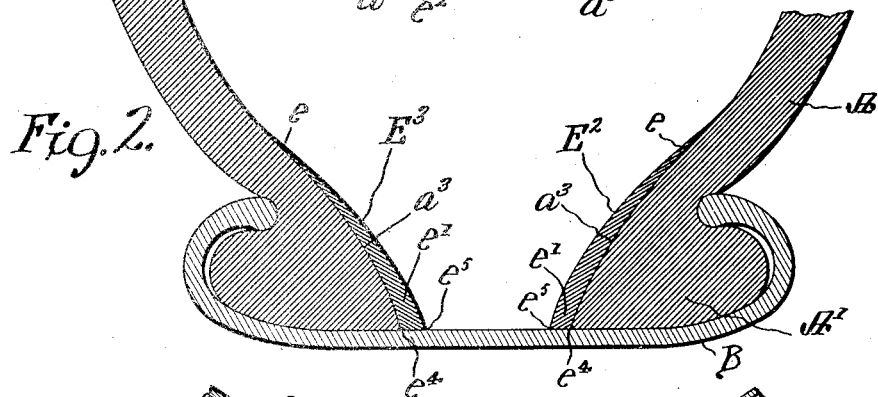
Figure 2 is a similar view, but shows the tire casing of the clincher or soft bead type.

In the form of device shown in Figure 2, the tire A is provided with a soft bead A' of the clincher type and fits snugly against the outer periphery of the rim as shown. In this case the construction of the strips $E^2$ and $E^3$ is generally similar to that already described with relation to Figure 1, except that the edges $e^4$ and $e^5$ engage normally the outer face of the rim.

Figure 3:
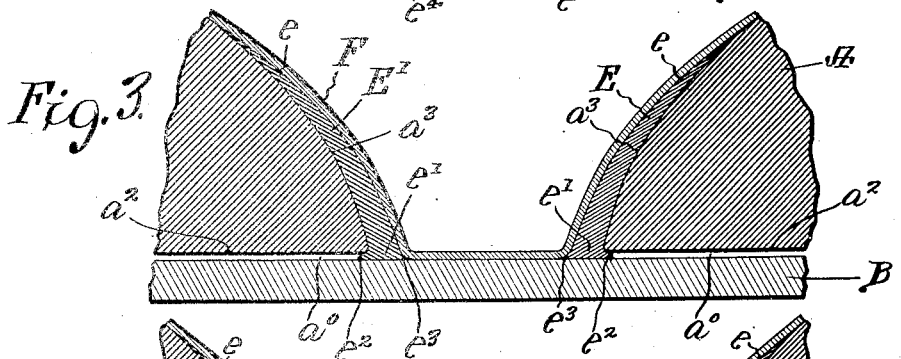
Figure 3 is a similar view to Figure 1, but shows the inner tube inserted and under pneumatic pressure; the parts being shown on a larger scale.
Figure 4:
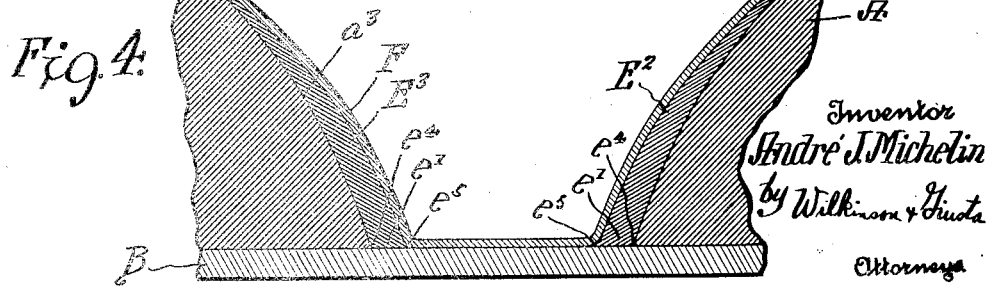
Figure 4 is a similar view to Figure 2, but shows the inner tube inserted and under pneumatic pressure, the parts also being shown on a larger scale.

The operation of the device is the same in both cases, irrespective of the nature of the tire, as shown in Figures 3 or 4, where when the inner tube F is inserted and pneumatic pressure is applied thereto, the side strips will form a soft yielding bearing for the adjacent portions of the inner tube and will not permit any creasing or pinching of the tube at the joint, and at the same time will permit that portion of the inner tube which is between the strips to bear directly on the outer face of the rim.

It will be seen that there is very little downward wedging effect on the outer thin portion of the strip, and that the inner thickened portion permits the soft elastic material of the strip to adapt itself to the adjacent contours of the inner tube, the casing and the metal rim filling up thoroughly the gap between the rim and the bead, and thus providing a soft yielding bearing for the inner tube at the locus of maximum normal trouble.

In the case of a soft bead tire as shown in Figs. 2 and 4, the inner edge of the strip, next the rim, will prevent the inner tube from being pinched under the bead should the latter be lifted as in making a sharp turn with the vehicle when at high speed. The herein described construction renders it more practicable to have the inner tube in contact with the middle rim of the wheel, which is desirable for the following reasons.

The convection currents of air which exist in the inside of the inner tube when the wheel is in rapid rotation will tend to carry away a considerable amount of the heat generated by the repeated compressions of the air in the inner tube, and this will serve in a measure to cool the tire.

It will be seen that the profile of the strip, in cross section, is so tapered as to be of equal resistance throughout its thickness, which is least towards $e$, where the point does no work, becomes greatest next the rim where it works the most, where the rubber tends to pass under the bead, where it is stretched most, and, in consequence, where it is most apt to be torn, whether such tearing is occasioned in mounting the tire casing on the rim, or whether under the pressure of the compressed air in the inner tube.

The herein described arrangement offers the following advantages:

(a) It avoids efficiently the pinching of the inner tube.

(b) It does not become torn because it has a profile of equal resistance.

(c) It differs from known arrangements in that the rim is left exposed between the beads, and in contact with the inner tube, thus permitting the cooling off of the inner tube and incidentally of the inner portion of the casing.

The strips just described may be either molded on with the beads of the casing, or they may be subsequently glued or cemented on after the beads have been molded.

Having thus described my invention what I claim and desire to secure by Letters Patent of the United States is:—

1. An inner tube protector for use in pneumatic tires, comprising a pair of reversely disposed annular strips of soft rubber or similar material mounted on the opposite sides of the inner wall of the casing adjacent to the rim, the said strips being tapered in cross section, and having their greatest thickness near the rim.

2. An inner tube protector for use in pneumatic tires, comprising a pair of reversely disposed annular strips of soft rubber or similar material mounted on the opposite sides of the inner wall of the casing adjacent to the rim and provided with a lip projecting inwards towards the rim, the said strips being tapered in cross section and having their thickest portion near the rim.

3. An inner tube protector for use in pneumatic tires, comprising a pair of reversely disposed annular strips of soft rubber or similar material mounted on the opposite sides of the inner wall of the casing adjacent to the rim and projecting inwards towards the rim, the said strips being tapered in cross section and having their thickest portion near the rim, and the faces of said strips next the rim being substantially in the form of frustums of reversely disposed truncated cones.

ANDRÉ JULES MICHELIN.